United States Patent
Watakabe et al.

(10) Patent No.: US 7,790,817 B2
(45) Date of Patent: Sep. 7, 2010

(54) PROCESS FOR PRODUCING FLUOROPOLYMER

(75) Inventors: Atsushi Watakabe, Tokyo (JP); Susumu Saito, Tokyo (JP); Adam Luke Safir, Santa Clara, CA (US)

(73) Assignee: Asahi Glass Company, Limited, Tokyo (JP)

( * ) Notice: Subject to any disclaimer, the term of this patent is extended or adjusted under 35 U.S.C. 154(b) by 831 days.

(21) Appl. No.: 11/618,088

(22) Filed: Dec. 29, 2006

(65) Prior Publication Data

US 2008/0161511 A1 Jul. 3, 2008

(51) Int. Cl.
*C08F 2/00* (2006.01)

(52) U.S. Cl. .................. 526/79; 526/201; 526/206; 526/247; 526/249; 549/453

(58) Field of Classification Search ............... 526/79, 526/247, 249; 523/201, 206; 549/453
See application file for complete search history.

(56) References Cited

U.S. PATENT DOCUMENTS

| | | | | |
|---|---|---|---|---|
| 4,952,653 | A * | 8/1990 | Tomihashi et al. | 526/249 |
| 5,646,201 | A * | 7/1997 | Araki et al. | 523/201 |
| 5,955,556 | A * | 9/1999 | McCarthy et al. | 526/249 |
| 7,220,508 | B2 | 5/2007 | Watakabe et al. | 429/33 |
| 2004/0230018 | A1* | 11/2004 | Okazoe et al. | 526/242 |
| 2006/0099476 | A1* | 5/2006 | Watakabe et al. | 429/33 |

FOREIGN PATENT DOCUMENTS

| WO | WO 03/037885 A1 | 5/2003 |
|---|---|---|
| WO | WO-03/037885 A1 * | 5/2003 |
| WO | WO 2005/096422 A1 | 10/2005 |
| WO | WO-2005/096422 A1 * | 10/2005 |

OTHER PUBLICATIONS

U.S. Appl. No. 12/042,810, filed Mar. 5, 2008, Tayanagi, et al.

* cited by examiner

*Primary Examiner*—Peter D. Mulcahy
*Assistant Examiner*—Henry Hu
(74) *Attorney, Agent, or Firm*—Oblon, Spivak, McClelland, Maier & Neustadt, L.L.P.

(57) ABSTRACT

Provided is a process for producing a fluoropolymer containing repeating units based on a fluoromonomer represented by the following formula (m) in an amount of from 5 to 50 mol % based on the entire repeating units in the polymer by polymerization reaction of tetrafluoroethylene and the fluoromonomer, wherein the polymerization reaction is carried out by continuously charging the reactor with tetrafluoroethylene and the fluoromonomer:

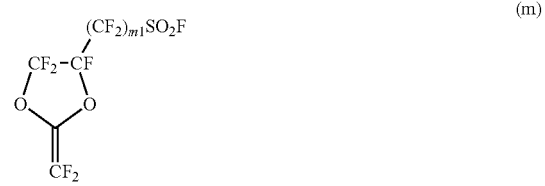

wherein ml is an integer of from 1 to 6. Also provided is an electrolyte material for an electrolyte fuel cell which can be operated at a high temperature to obtain a high output, wherein the electrolyte material contains the fluoropolymer produced by the process.

10 Claims, 1 Drawing Sheet

PROCESS FOR PRODUCING FLUOROPOLYMER

BACKGROUND OF THE INVENTION

1. Field of the Invention

The present invention relates to a fluoropolymer useful as an electrolyte material constituting an electrolyte membrane, or an electrolyte material contained in a catalyst layer for polymer electrolyte fuel cells.

2. Discussion of Background

Heretofore, for membranes for electrolysis of sodium chloride, for membranes or catalyst layers for polymer electrolyte fuel cells, it has been common to employ a polymer which is obtainable by hydrolyzing a copolymer of a fluoromonomer represented by the formula $CF_2=CF-(OCF_2CFR^x)_{x1}-O_{x2}-(CF_2)_{x3}-SO_2F$ (wherein $R^x$ is a fluorine atom or a trifluoromethyl group, x1 is an integer of from 0 to 3, x2 is 0 or 1, and x3 is an integer of from 1 to 12, provided that x1+x2>0) with tetrafluoroethylene, or a polymer having sulfonic acid groups obtainable by further converting it to an acid form (hereinafter referred to as a sulfonic acid polymer).

Such a sulfonic acid polymer has a softening temperature in the vicinity of 80° C. Accordingly, the operation temperature of a fuel cell employing such a polymer is usually at most 80° C. However, in a case where hydrogen obtainable by reforming an organic compound such as methanol, natural gas or gasoline, is used as a fuel gas for a fuel cell, if carbon monoxide is contained even in a trace amount, the electrode catalysts will be poisoned, and the output of the fuel cell tends to be low. Accordingly, in order to prevent such a trouble, it is desired to increase the operation temperature. Further, also with a view to downsizing the cooling device for fuel cells, it is desired to increase the operation temperature, and preferably, a membrane for operation at a temperature of at least 120° C. is desired. However, the above-mentioned conventional sulfonic acid polymer has a low softening temperature and can not satisfy such demands.

As a polymer having a high softening temperature, a copolymer of a monomer represented by the following formula (y) (hereinafter referred to simply as a monomer (y)) with tetrafluoroethylene, has been proposed (WO03/037885). In the formula, $Q^y$ is a fluorinated bivalent organic group, and each of $R^{y1}$ to $R^{y3}$ which are independent of one another, is a fluorine atom or a fluorinated monovalent organic group.

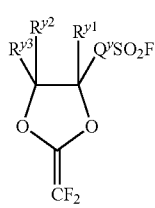

As mentioned above, fuel cells are preferably used under a high temperature condition. For example, polymer electrolyte fuel cells are preferably operated at a high temperature (for example, at a temperature of at least 120° C.) in order to facilitate heat removal and to increase the efficiency for power generation. For this purpose, a sulfonic acid polymer showing high mechanical strength in a high temperature region, is desired for e.g. the electrolyte membrane for polymer electrolyte fuel cells.

However, in a case where $Q^y$ in the monomer (y) in WO03/037885 is a perfluoro(etheric oxygen atom-containing alkylene) group such as $-CF_2OCF_2CF_2-$, the softening temperature of the polymer obtainable by polymerizing the monomer (y) was not sufficiently high.

The present inventors have proposed a polymer which has a high softening temperature and has mechanical strength maintained even when used under high temperature conditions in WO05/096422. However, in a case where the polymer is produced by the method disclosed in WO05/096422, it was difficult to stabilize the polymer composition with high reproducibility.

SUMMARY OF THE INVENTION

Under these circumstances, it is an object of the present invention to provide a process for producing such a polymer with a stable composition with high reproducibility.

The present invention provides a process for producing a fluoropolymer containing repeating units based on a fluoromonomer represented by the following formula (m) in an amount of from 5 to 50 mol % based on the entire repeating units in the polymer by polymerization reaction of tetrafluoroethylene and the above fluoromonomer, wherein the polymerization reaction is carried out by continuously charging the reactor with tetrafluoroethylene and the fluoromonomer:

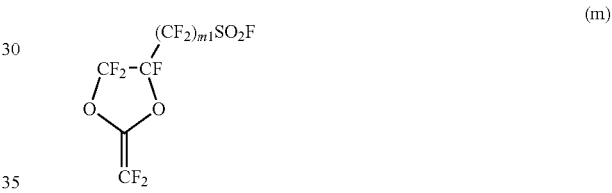

wherein m1 is an integer of from 1 to 6.

According to the present invention, a polymer having a softening temperature higher than that of a conventional perfluorosulfonic acid polymer with a stable composition can be provided.

DETAILED DESCRIPTION OF THE PREFERRED EMBODIMENTS

Figure 1:
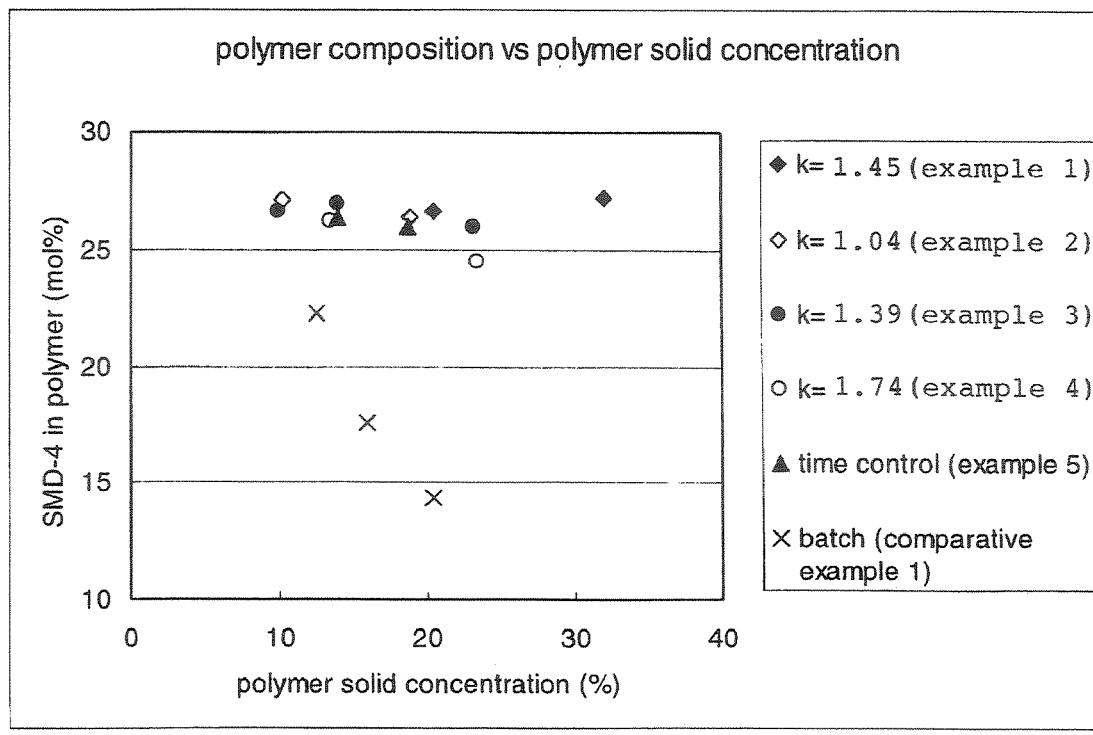
FIG. 1 is a diagram illustrating the relation between the solid concentration and the composition of polymers obtained in Examples 1 to 4.

In this specification, a compound represented by the formula (a) will be referred to as a compound (a) Units represented by the formula (A) will be referred to as units (A). The same applies to compounds and units represented by other formulae.

Units in a polymer are meant for monomer units (also referred to as repeating units) derived from a monomer and formed by polymerization of such a monomer. In the present invention, the units may be units directly formed by a polymerization reaction or units formed by a chemical conversion after the polymerization reaction.

A polymer obtainable by the production process of the present invention (hereinafter referred to as the present invention) is a polymer containing monomer units based on tetrafluoroethylene and the following monomer units (M) (hereinafter referred to as the polymer (M)) (wherein m1 is an integer of from 1 to 6, and the same applies hereinafter).

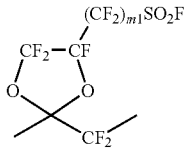

The following monomer units may be mentioned as specific examples of the monomer units (M):

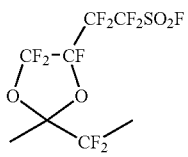 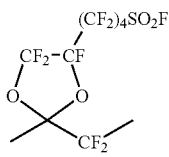

The polymer (M) can be produced by polymerizing the following compound (m) with tetrafluoroethylene. The polymer is a polymer containing units (M).

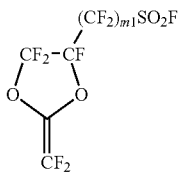

In the compound (m), m1 is an integer of from 1 to 6, preferably an integer of from 1 to 4, particularly preferably an integer of from 2 to 4. The compound (m) of the present invention is characterized in that the number m1 for the group represented by the formula —$(CF_2)_{m1}$— as the group separating the dioxolane skeleton and the —$SO_2F$ group, is small, and groups other than the group represented by the formula —$(CF_2)_{m1}SO_2F$ bonded to the dioxolane skeleton are fluorine atoms. Accordingly, the polymer obtained by polymerizing the compound (m) can realize the characteristics such as a high softening temperature and high mechanical strength.

The following compounds may be mentioned as specific examples of the compound (m):

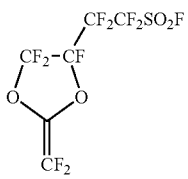 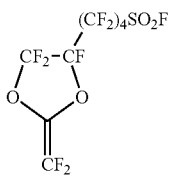

The proportion of units (M) to the total units in the polymer (M) may suitably be changed depending upon the particular application of the polymer (M). In a usual case, the proportion of units (M) to the total units in the polymer (M) is from 5 to 50 mol %.

In a case where the polymer (M) is to be used as a material for an ion exchange membrane, the proportion of units (M) is preferably adjusted within the following range depending upon the structure or particular application of the polymer (M).

From such a viewpoint that high power generation efficiency can be obtained with a low resistance, the proportion of units (M) to the total units in the polymer (M) is at least 5 mol %, particularly preferably at least 10 mol % Further, from the viewpoint of the mechanical properties, the proportion of units (M) to the total units in the polymer (M) is at most 50 mol %, particularly preferably at most 35 mol %.

In a process for producing the present polymer, the monomer (m) is subjected to radical polymerization with tetrafluoroethylene in the presence of a radical initiating source.

Such polymerization reactions are not particularly limited so long as they are carried out under such a condition that radicals will be formed. For example, they may be carried out by bulk polymerization, solution polymerization, suspension polymerization, emulsion polymerization, polymerization in a liquid or supercritical carbon dioxide, etc.

The method to let radicals form, is not particularly limited, and for example, a method of irradiating radiation rays such as ultraviolet rays, γ-rays or electron rays, may be employed, or a method of using a radical initiator which is commonly used in a radical polymerization, may be employed. The reaction temperatures for the polymerization reactions are not particularly limited, and for example, they are usually from about 15 to 150° C. In a case where a radical initiator is to be employed, the radical initiator may, for example, be a bis(fluoroacyl)peroxide, a bis(chlorofluoroacyl)peroxide, a dialkyl peroxy dicarbonate, a diacyl peroxide, a peroxyester, an azo compound or a persulfate.

In a case where solution polymerization is to be carried out, a solvent subject to little chain transfer to the solvent, is employed. And, a prescribed amount of tetrafluoroethylene and monomer (m) is put into the solvent, and a radical initiator, etc. may be added to let radicals form thereby to carry out the polymerization.

Here, the solvent which may be used, may, for example, be a perfluorotrialkylamine such as perfluorotributylamine, a perfluorocarbon such as perfluorohexane or perfluorooctane, a hydrofluorocarbon such as 1H,4H-perfluorobutane or 1H-perfluorohexane, or a chlorofluorocarbon such as 3,3-dichloro-1,1,1,2,2-pentafluoropropane or 1,3-dichloro-1,1,2,2,3-pentafluoropropane. To adjust the molecular weight, a hydrocarbon compound such as hexane or methanol may be added.

The suspension polymerization may be carried out by using water as a dispersing medium, adding a monomer to be polymerized, and employing, as a radical initiator, a non-ionic initiator such as a bis(fluoroacyl)peroxide, a bis(chlorofluoroacyl)peroxide, a dialkyl peroxy dicarbonate, a diacyl peroxide, a peroxyester or an azo compound. A solvent mentioned with respect to the solution polymerization may be added as an adjuvant. Further, in order to prevent flocculation of suspended particles, a surfactant may optionally be added as a dispersion stabilizer.

In the present invention, polymerization by any polymerization method is carried out by additionally charging tetrafluoroethylene and the monomer (m).

As in the method disclosed in WO05/096422, if polymerization is carried out under batch conditions, the composition of the polymer formed changes depending upon the timing of stopping the polymerization since the composition greatly depends on the concentration of the polymer formed, and it is thereby difficult to produce a polymer having the same composition with high reproducibility. Accordingly, the present inventors have conducted extensive studies and as a result, they have found that fluctuations in composition of the polymer obtained become small by continuously charging tetrafluoroethylene and the monomer (m) throughout the polymerization, whereby a polymer having the same composition can be obtained with high reproducibility.

Particularly, when the monomer (m) is continuously charged throughout the polymerization at a constant temperature while the polymerization pressure is maintained constant, fluctuations in composition of the polymer can readily be reduced, whereby a polymer having the same composition can be obtained with high reproducibility. In such a case, the monomer (m) and a polymerization solvent may preliminarily be mixed and additionally charged.

Further, the fluoromonomer is continuously charged so that the ratio $M_t/M_m$ of the amount ($M_t$) of tetrafluoroethylene additionally charged in the polymerization reaction to the cumulative amount ($M_m$) of the monomer (m) added to the reactor will be constant. In a case where the pressure of tetrafluoroethylene is constant, the above ratio $M_t/M_m$ is preferably from 0.5 to 2.5 times, particularly preferably from 1.0 to 2.0 times the stoichiometrical molar ratio (repeating units based on tetrafluoroethylene)/(units (M)) (hereinafter this value will be referred to as k value) of the fluoropolymer to be obtained. The theoretical optimum k value is a value larger than 1 since tetrafluoroethylene is dissolved in the additionally charged monomer (m) and the polymerization solvent accompanying the monomer. Surprisingly, the reproducibility of the polymer composition can be drastically improved when the value $M_t/M_m$ is within the above range as compared with a case where no additional charging is carried out.

By "continuous charging" or "continuously charging" it is intended to mean that monomer is charged to the reactor throughout the polymerization, either in discrete intervals or in a non-stop manner.

For example, with respect to the additional charging of the monomer (m), the above ratio $M_t/M_m$ is not necessarily constant, and the monomer (m) in an amount required for the continuous charging may be dividedly added at regular intervals, or it may be constantly added in a non-stop manner so that the amount added per unit time is constant. The above effect can be obtained in such cases also.

Further, the polymer (M) may be fluorinated with fluorine gas after polymerization for improving durability, or may be subjected to heat treatment in the presence of the air/or water to stabilize unstable moieties such as polymer terminals. Such conversion of groups and treatment of the polymer may be carried out in accordance with a known method under known conditions.

In a case where the polymer (M) is to be used as a material for an ion exchange membrane, some or all (preferably all) of the —SO$_2$F groups are converted to —SO$_3$H groups before use. The conversion of —SO$_2$F groups can be carried out in accordance with a known method. For example, a method of alkali hydrolysis treatment, followed by acid treatment, may be mentioned. This method is preferably carried out in accordance with the method disclosed in WO03/37885.

The polymer (M) having —SO$_2$F groups converted to —SO$_3$H groups, has a structure in which one of the carbon atoms constituting the main chain is a carbon atom forming a perfluoro(1,3-dioxolane) skeleton, and the carbon atom at the 4-position of the skeleton is substituted by a group represented by the formula —(CF$_2$)$_{m1}$SO$_3$H (wherein m1 is as defined above). Such a polymer (M) is excellent in the mechanical strength and softening temperature and has proton conductivity. Accordingly, the polymer (M) of the present invention is useful as the above-mentioned electrolyte material for polymer electrolyte fuel cells, i.e. as an electrolyte material to be used for membranes or catalyst layers for fuel cells. Such a polymer (M) can also be used for membranes for brine electrolysis.

A process for producing the compound (m) is preferably carried out in accordance with the method disclosed in WO05/096422, and the following process may be mentioned wherein the following compound (m-3) is converted to the following compound (m-2) by a liquid phase fluorination reaction, and then the compound (m-2) is converted to the following compound (m-1) by an ester decomposition reaction, and then the compound (m-1) is subjected to a thermal decomposition reaction (wherein $R^{EF}$ represents a fluorinated monovalent organic group).

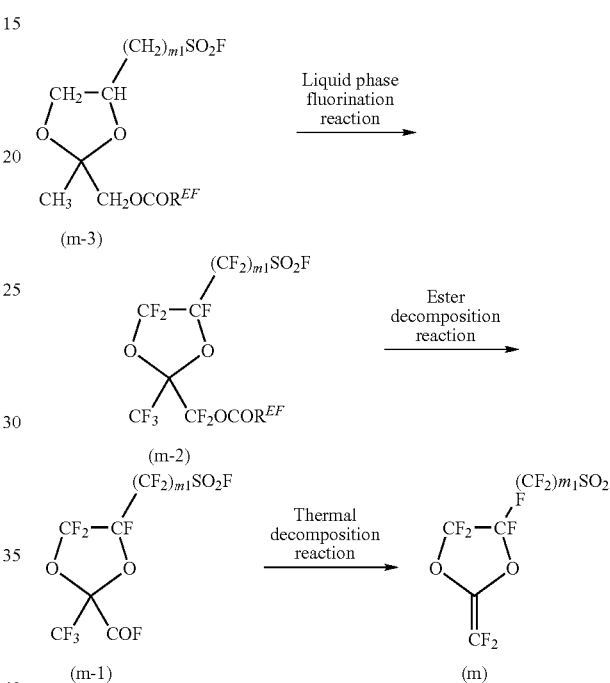

The ion exchange capacity (hereinafter referred to as $A_R$) of the polymer (M) is preferably from 0.5 to 3.0 meq/g dry resin (hereinafter referred to as meq/g). If $A_R$ of the polymer (M) is too small, the water content of the electrolyte material tends to be low, whereby the ion conductivity tends to be low, and when it is used as an electrolyte membrane for a polymer electrolyte fuel cell, it tends to be difficult to obtain a sufficient cell output. From the same viewpoint, it is more preferably at least 0.7 meq/g, further preferably at least 0.9 meq/g. On the other hand, if $A_R$ becomes too large, the density of ion exchange groups in the polymer (M) increases, and the strength of the polymer (M) tends to be low. From the same viewpoint, $A_R$ of the polymer (M) is further preferably at most 2.0 meq/g.

Further, for the polymer (M) to have sufficient strength particularly for use as a membrane material for fuel cells, $\Delta T$ as defined below, is preferably at least 40° C., more preferably at least 60° C. From the viewpoint of the strength of the polymer, there is no upper limit for $\Delta T$. However, in a case where the membrane is formed by a casting method, or the electrolyte material is to be incorporated in a catalyst layer, from the viewpoint of the solubility or dispersibility in a solvent, or in a case where it is melt-molded, from the viewpoint of the melt moldability of the precursor for the electrolyte material, $\Delta T$ is preferably at most 150° C., more preferably at most 120° C.

ΔT is defined by the following formula by using the data obtained by measurement of the dynamic viscoelasticity.

$$\Delta T = T_2 - T_1,$$

$T_2$: the temperature at which the storage modulus (tensile mode) becomes $1 \times 10^6$ Pa, $T_1$: the peak temperature of the loss modulus (the softening temperature).

The above-described relation between the polymer strength and ΔT is considered to be attributable to the fact that ΔT increases as the molecular weight of the polymer increases. For the measurement of the dynamic viscoelasticity, the temperature is raised until the storage modulus decreases to $1 \times 10^6$ Pa. However, in a case where the molecular weight of the polymer is very large, there may be a case where the modulus will not decrease to $1 \times 10^6$ Pa till in the vicinity of 350° C. i.e. the decomposition temperature of the polymer. In such a case, $T_2 > T_{max}$, where $T_{max}$ is the maximum temperature for measurement. For example, in a case where $T_1 = 150°$ C. and $T_{max} = 340°$ C., $\Delta T > 190°$ C.

The polymer (M) has a softening temperature of at least 120° C. In the case of a polymer containing units wherein an ionic group and a 5-membered ring are bonded via an etheric oxygen atom-containing perfluoroalkylene group, as specifically disclosed in Examples in WO03/37885, the softening temperature is about 100° C., and by the structure of the present alicyclic units, a softening temperature of at least 120° C. can be accomplished. If the softening temperature is high, it is possible to have a fuel cell operated at a high temperature. Here, the softening temperature in the present invention is defined to be a temperature at which a loss modulus shows the maximum value in the measurement of the dynamic viscoelasticity at a temperature raising rate of 2° C./min at a frequency of 1 Hz in a temperature range where the resin is softened and the storage modulus abruptly decreases. Namely, this softening temperature is the same as $T_1$ mentioned above.

Now, the present invention will be described in further detail with reference to Examples. However, it should be understood that the present invention is by no means restricted to such specific Examples.

Abbreviations;
TFE tetrafluoroethylene
AK-225G: CClF$_2$CF$_2$CHClF
AIBN: (CH$_3$)$_2$C(CN)—N=N—C(CH$_3$)$_2$(CN)
SMD-4: compound (m4)

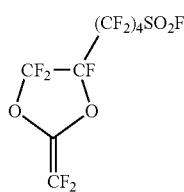

(m4)

EXAMPLE 1

(IP Control Polymerization)

Two reactors of 10 ml capacity, constructed of stainless steel, in N$_2$ atmosphere, were each charged with 0.398 g of SMD-4, 4.410 g of AK-225 cb, 0.0047 g of AIBN, and 0.0003 g of methanol. The reactors were heated to 65 degrees centigrade. TFE was charged to 1.152 MPa (gauge pressure) and continuously charged to keep a constant pressure during polymerization. The k value was set at 1.45 (composition target: 27 mol % of SMD-4). At every 0.0672 g of continuously charged TFE gas 0.0786 g of SMD-4 was added as a solution of 30 wt % SMD-4 in AK-225 cb. One polymerization was stopped after 3 addition at 2.8 hours, and the other was stopped after 10 addition at 7.2 hours by addition of 0.0102 g of Topanol-A as a chemical quencher. The reactors were cooled to room temperature and the non-reacted TFE was discharged. The polymers were washed with hexane twice and vacuum dried at 80 degrees centigrade for 16 hours to afford 612 mg and 1371 mg of polymer, respectively. The SMD-4 content of polymers were measured by Raman was 26.6 and 27.2 mol %, respectively.

EXAMPLE 2

(IP Control Polymerization)

Two reactors of 10 ml capacity, constructed of stainless steel, in N$_2$ atmosphere, were each charged with 0.675 g of SMD-4, 4.074 g of AK-225 cb, 0.0023 g of AIBN, and 0.0009 g of methanol. The reactors were heated to 65 degrees centigrade. TFE was charged to 1.193 MPa (gauge pressure) and continuously charged to keep a constant pressure. The k value was set at 1.04 (Composition target: 27 mol % of SMD-4). At every 0.0534 g of continuously charged TFE gas 0.0866 g of SMD-4 was added as a solution of 33 wt % SMD-4 in AK-225 cb. One polymerization was stopped after 2 addition at 1.7 hours, and the other was stopped after 10 addition at 4.9 hours by addition of 0.005 g of Topanol-A as a chemical quencher. The reactors were cooled to room temperature and the non-reacted TFE was discharged. The polymers were washed with hexane twice and vacuum dried at 80 degrees centigrade for 16 hours to afford 468 mg and 1180 mg of polymer, respectively. The SMD-4 content of the polymers were measured by Raman was 27.1 and 26.4 mol %, respectively.

EXAMPLE 3

(IP Control Polymerization)

Three reactors of 10 ml capacity, constructed of stainless steel, in N$_2$ atmosphere, were each charged with 0.675 g of SMD-4, 4.074 g of AK-225 cb, 0.0023 g of AIBN, and 0.0009 g of methanol. The reactors were heated to 65 degrees centigrade. TFE was charged to 1.297 MPa (gauge pressure) and continuously charged to keep a constant pressure. The k value was set at 1.39 (Composition target: 27 mol % of SMD-4). At every 0.0711 g of continuously charged TFE gas 0.0866 g of SMD-4 was added as a solution of 33 wt % SMD-4 in AK-225 cb. One polymerization was stopped after 1 addition at 1.3 hours, the second after 2 addition in 1.7 hours, and the last after 10 addition in 4.9 hours by addition of 0.005 g of Topanol-A as a chemical quencher. The reactors were cooled to room temperature and the non-reacted TFE was discharged. The polymers were washed with hexane twice and vacuum dried at 80 degrees centigrade for 16 hours to afford 481 mg, 608 mg, and 1509 mg of polymer respectively. The SMD-4 content of the polymers were measured by Raman was 26.6, 27.0 and 26.0 mol %, respectively.

EXAMPLE 4

(IP Control Polymerization)

Two reactors of 10 ml capacity, constructed of stainless steel, in N$_2$ atmosphere, were each charged with 0.675 g of SMD-4, 4.074 g of AK-225 cb, 0.0023 g of AIBN, and 0.0009 g of methanol. The reactors were heated to 65 degrees centigrade. TFE was charged to 1.297 MPa (gauge pressure) and continuously charged to keep a constant pressure. The k value was set at 1.74 (Composition target: 27 mol % of SMD-4). At every 0.0890 g of continuously charged TFE gas 0.0866 g of SMD-4 was added as a solution of 33 wt % SMD-4 in AK-225 cb. One polymerization was stopped after 2 addition at 1.8 hours, and the other was stopped after 10 addition at 5.1 hours by addition of 0.005 g of Topanol-A as a chemical quencher. The reactors were cooled to room temperature and the non-reacted TFE was discharged. The polymers were washed with hexane twice and vacuum dried at 80 degrees centigrade for 16 hours to afford 687 mg and 1657 mg of polymer. The SMD-4 content of the polymers were measured by Raman was 26.2 and 24.5 mol %, respectively.

In Examples 1 to 4, the polymer yield did not necessarily agree with the expected value, but the polymer composition closely agreed with the expected value.

EXAMPLE 5

(Time control polymerization)

One reactor of 10 ml capacity, constructed of stainless steel, in $N_2$ atmosphere, were charged with 0.397 g of SMD-4, 4.403 g of AK-225 cb, 0.0023 g of AIBN, and 0.0077 g of methanol. Another similar reactor was charged with 0.398 g of SMD-4, 4.411 g of AK-225 cb, 0.0023 g of AIBN, and 0.0010 g of methanol. The reactors were heated to 65 degrees centigrade. TFE was charged to 1.000 MPa (gauge pressure) and continuously charged to keep a constant pressure. The semicontinuous addition of SMD-4 was controlled by reaction time. At every 0.5 h, 0.0785 g of SMD-4 was added as a solution of 33 wt % SMD-4 in AK-225 cb solution to each reactor. Both polymerizations were stopped after 10 addition at 5.5 hours by addition of 0.005 g of Topanol-A as a chemical quencher. The reactors were cooled to room temperature and the non-reacted TFE was discharged. The polymers were washed with hexane twice and vacuum dried at 80 degrees centigrade for 16 hours to afford 866 mg and 765 mg of polymer, respectively. The SMD-4 content of the polymers were measured by Raman was 25.9 and 26.3 mol %, respectively.

COMPARATIVE EXAMPLE 1

(Batch Polymerization)

Three reactors of 10 ml capacity, constructed of stainless steel, in $N_2$ atmosphere, were charged with 0.697g of SMD-4, 8.036 g of AK-225 cb, 0.0042 g of AIBN, and 0.0135 g of methanol. The reactors were heated to 65 degrees centigrade. TFE was charged to 0.924 MPa (gauge pressure) and the polymerization was then conducted under batch conditions in terms of TFE (the pressure decreased as TFE was incorporated into the polymers). The polymerizations were stopped when the TFE pressure reached to 0.7 MPa at 4.2 hours, 0.5 MPa at 9.4 hours, and 0.35 MPa at 22.4 hours by addition of 0.0091 g of Topanol-A as a chemical quencher. The reactors were cooled to room temperature and the non-reacted TFE was discharged. The polymer was washed with hexane twice and vacuum dried at 80 degrees centigrade for 16 hours to afford 960 mg, 1365 mg, and 1550 mg of polymer, respectively. The SMD-4 content of the polymers were measured by Raman was 22.3, 17.6 and 14.4 mol %, respectively.

The results of Examples 1-5, and Comparative Example 1 are shown in FIG. 1.

According to the production process of the present invention, a polymer having a high softening temperature can be provided with a stable composition. Therefore, polymer electrolyte fuel cells prepared by employing such a polymer as an electrolyte material can be provided with stable performance, and can be operated at a high temperature.

What is claimed is:

1. A process for producing a fluoropolymer containing repeating units based on a fluoromonomer represented by the following formula (m) in an amount of from 5 to 50 mol % based on the entire repeating units in the polymer by polymerization reaction of tetrafluoroethylene and the above fluoromonomer, wherein the polymerization reaction is carried out by continuously charging the reactor with tetrafluoroethylene and the fluoromonomer:

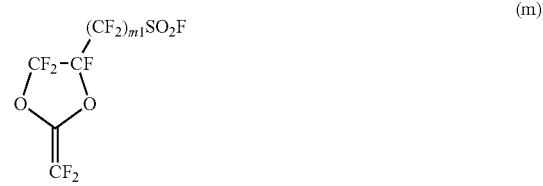

(m)

wherein m1 is an integer of from 1 to 6.

2. The process for producing a fluoropolymer according to claim 1, wherein tetrafluoroethylene is continuously charged at a constant temperature under a constant pressure of a reactor.

3. The process for producing a fluoropolymer according to claim 2, wherein the fluoromonomer is continuously charged so that the molar ratio $M_t/M_m$ of the amount ($M_t$) of tetrafluoroethylene additionally charged in the polymerization reaction to the cumulative amount ($M_m$) of the fluoromonomer continuously charged to the reactor is constant.

4. The process for producing a fluoropolymer according to claim 3, wherein the fluoromonomer is charged discrete intervals or constantly throughout the polymerization so that the above ratio $M_t/M_m$ is controlled to be within a range of from 0.5 to 2.5 times the stoichiometric molar ratio (repeating units based on tetrafluoroethylene)/(repeating units based on the fluoromonomer) of the fluoropolymer to be obtained.

5. The process for producing a fluoropolymer according to claim 4, wherein the fluoromonomer is represented by the following formula (m4):

(m4)

6. The process for producing a fluoropolymer according to claim 3, wherein the fluoromonomer is additionally charged discrete intervals or constantly throughout the polymerization so that the above ratio $M_t/M_m$ is controlled to be within a range of from 1.0 to 2.0 times the stoichiometric molar ratio (repeating units based on tetrafluoroethylene)/(repeating units based on the fluoromonomer) of the fluoropolymer to be obtained.

7. The process for producing a fluoropolymer according to claim 6, wherein the fluoromonomer is represented by the following formula (m4):

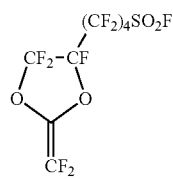

(m4)

8. The process for producing a fluoropolymer according to claim 1, wherein the fluoromonomer is successively added at regular intervals.

9. The process for producing a fluoropolymer according to claim 1, wherein the fluoromonomer is continuously added so that the amount of the fluoromonomer added per unit time is constant.

10. The process for producing a fluoropolymer according to claim 8, wherein the fluoromonomer is represented by the following formula (m4):

* * * * *